May 18, 1937.  G. FREDRICKSON  2,080,400

HEATING APPARATUS

Filed Dec. 5, 1934   2 Sheets-Sheet 1

INVENTOR:
GUSTAV FREDRICKSON,
BY
HIS ATTORNEY.

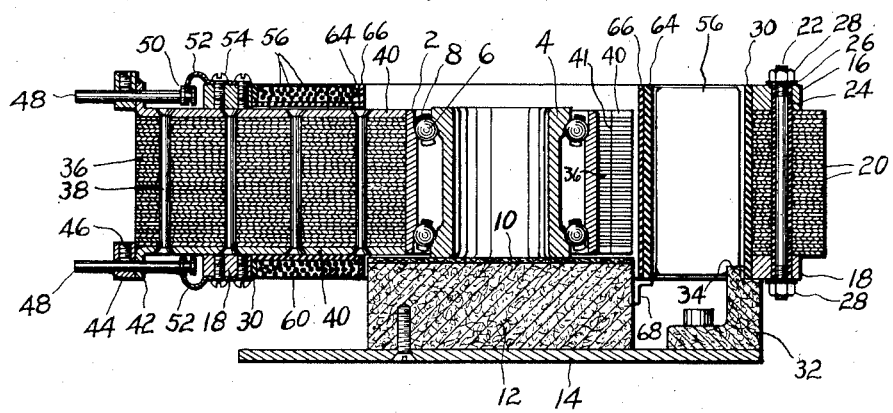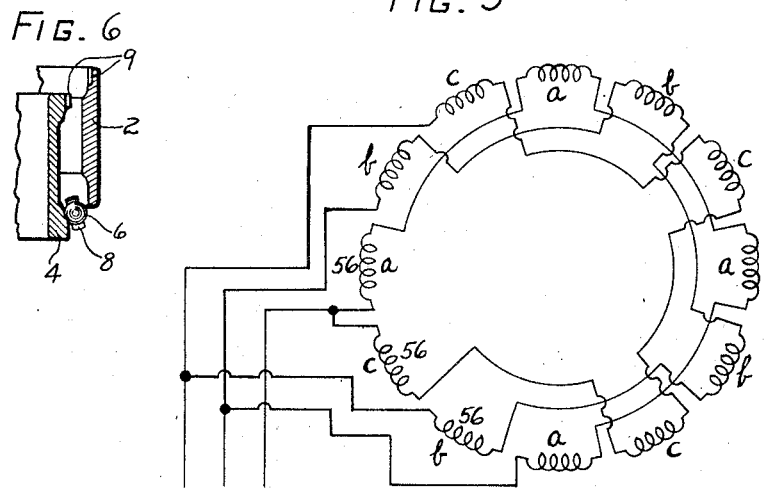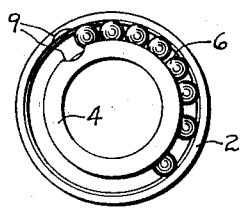

Patented May 18, 1937

2,080,400

UNITED STATES PATENT OFFICE 2,080,400

HEATING APPARATUS

Gustav Fredrickson, Forestville, Conn., assignor to General Motors Corporation, Detroit, Mich., a corporation of Delaware Application December 5, 1934, Serial No. 756,112

11 Claims. (Cl. 219—11)

This invention relates to heating apparatus and comprises all of the features and aspects of novelty herein disclosed. An object of the invention is to provide an improved heating apparatus adapted to heat the circumferential or skin portion of an article without heating the more central portions or to heat only the outer one of two concentric parts. Another object is to provide an improved induction heater.

To these ends and also to improve generally upon devices of this character, the invention consists in the various matters hereinafter described and claimed. In its broader aspects, the invention is not necessarily limited to the specific construction or steps selected for illustrative purposes in the accompanying drawings in which Fig. 1 is a plan view of the apparatus with an article in position for heating.

Fig. 4 is a cross sectional view about on the line 4—4 of Fig. 1.

Fig. 5 is a diagram.

Fig. 6 is a sectional view of a portion of an antifriction bearing.

Fig. 7 is a side view of the bearing.

Fig. 8 is a view of a portion of a ball separator.

Figure 1:
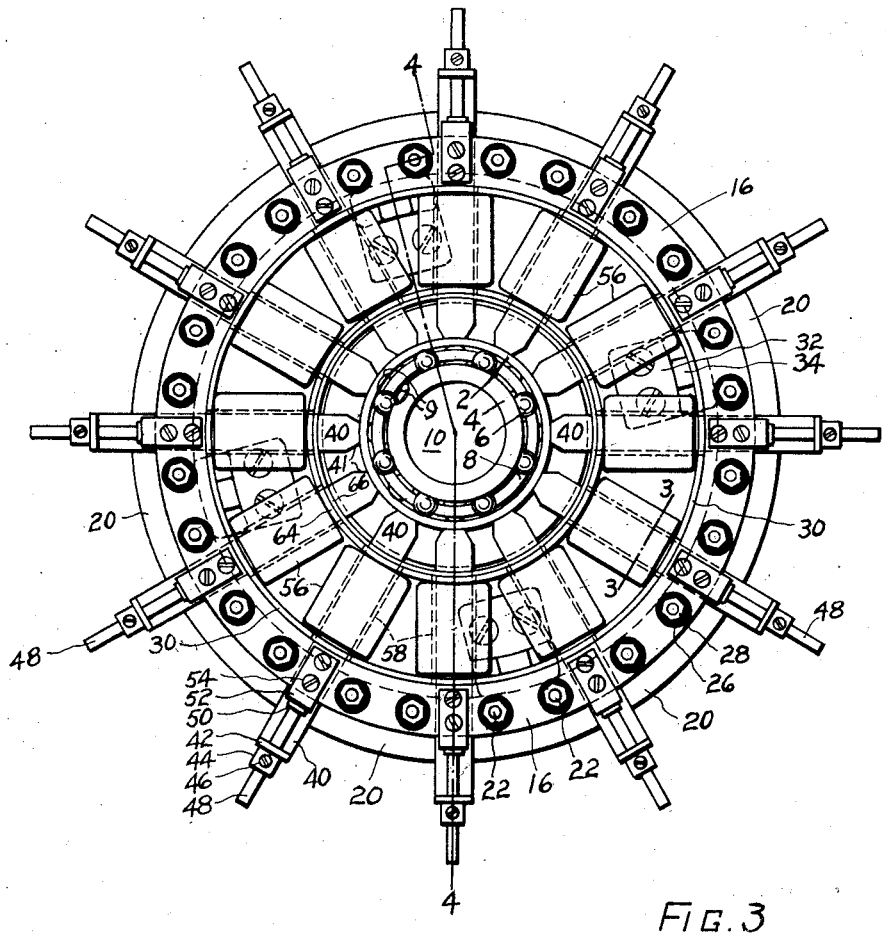
Figure 2:
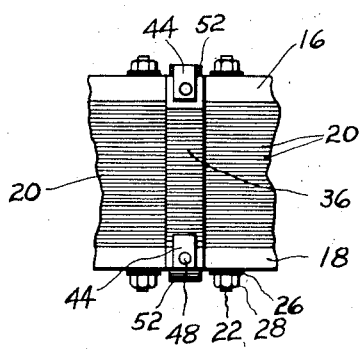
Fig. 2 is a portion of a side view of the apparatus.

In the present instance, the article to be heated is shown as a ball bearing comprising an outer race ring 2, an inner race ring 4, and two rows of balls 6 having separators or cages 8. The race rings are grooved and also have filling slots at one end as indicated at 9. As is well known, ball bearings are often assembled by forcing the balls or especially some of the last balls through filling slots and such assembly is facilitated if the outer race ring is expanded, as by pressure or heat or both. According to one common method of assembling a bearing, the outer race ring is heated by conduction from a hot-plate and then removed from the hot plate for assembly with the cold inner race ring and balls. Considerable heat escapes from the outer ring and unavoidably reaches the inner race ring by radiation and conduction during the interval of assembly and hence the full effect of expanding an outer race ring alone is not secured. Also, outer and inner race rings are frequently "matched", that is, each outer race ring has a specially selected inner race ring of proper size to go with it, and when many such bearings are to be assembled, there is a problem of insuring that the proper matched rings or pairs be kept track of during the heating of the outer race rings by themselves. According to the present invention, the bearing parts are partly assembled as a unit handling structure before any heat is applied, such parts comprising the two race rings and some of the balls. Then the outer race ring is quickly and uniformly heated by induction in such a way that no heat is induced in the inner race ring or those balls already inserted between the rings. The remaining balls are then inserted and spaced apart for caging while the outer race ring is so heated and expanded. The heater insures only circumferential or skin heat without much penetration and the interval of final assembly is so short that the inner race rings and balls remain cold and unexpanded. No bearing parts require handling while hot. The operator can begin to insert the last few balls while the heat is coming on and finish assembly at the time of maximum heat and thus the chance of damaging the balls or race rings by excessive pressure is avoided.

The article is shown supported on a replaceable wear surface 10 carried by a pad 12 both preferably being of fibrous material having heat insulating properties. The pad is conveniently fastened by screws to a base plate 14. A pair of parallel clamping rings 16 and 18 embrace a core comprising arcuate sets of laminations 20, a pair of bolts 22 passing through each set of laminations and the rings. Sleeves 24 of insulating material surround the bolts while washers 26 of insulating material engage the ends of the sleeves and the opposite faces of the rings, nuts 28 clamping all the foregoing parts together. A sleeve or lining 30 is placed inside of the rings, and the sleeve and the ring 18 are seated on angular supports 32 having centering lugs 34. The rings 16 and 18 are continuous but adjacent sets of arcuate laminations 20 are spaced apart to receive a narrow, deep, plunger comprising laminations 36 held by non-magnetic rivets 38 welded to upper and lower holding plates 40. The plungers (of which there are preferably a large number) are arranged radially of the rings, their inner ends engaging the external periphery of the article to be heated. The end portions are bevelled off as at 41 to give clearance when the plungers are adjusted towards the center to engage articles of small diameter.

Each upper and lower plate 40 of each laminated plunger has a lug 42 welded or otherwise permanently fixed to a little plate 44 which carries a set screw 46 for adjustably securing the plate and the plunger to a rod 48. The rod has a pair of collars 50 forming a groove to receive the forked end of a curved spring 52 which is fastened by screws 54 to one of the rings 16 or 18. Each rod 48 is so fixed by its set screws to the plunger that the spring 52 is flexed or biased to slightly withdraw or hold the plungers a little distance away from the work recess so that the work can be dropped into place. The set screws also provide for an adjustment of the plungers and springs for co-operation with articles of various diameters. The plungers move radially inwards a short distance towards the work by magnetic forces as will appear.

Figure 3:
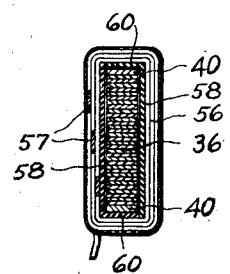
Fig. 3 is a cross sectional view on the line 3—3 of Fig. 1.

A coil 56 surrounds each laminated plunger, the wire 57 (Fig. 3) being wrapped several times spirally around a rectangular supporting spool or housing comprising a pair of angle members of insulating material, each having an upright wall 58 and a short horizontal wall 60. Each spool or housing clears the shiftable plunger and is itself supported by extending its walls 58 and 60 radially outwardly to fit into the plunger opening in the sleeve or lining 30. The walls 58 and 60 are also extended radially inwardly to fit an opening in a ring 64 of insulating material. These inwardly extended walls abut at their ends against a second ring or layer 66 of insulating material which lines the ring 64 while the ends of the outwardly extended walls abut against the rings 16 and 18 and thus the spools cannot shift radially. The rings 64 and 66 may be conveniently supported from the pad 32 by angle brackets 68.

As indicated in Fig. 5, the coils 56 are connected up to take power from a three-phase, three-wire, alternating current line, preferably about 300 cycles. The connections are grouped in so-called "delta", the selected embodiment having four coils in series on each delta connection as indicated by the three groups of letters a, b, and c. When the current is switched on, the laminated plungers (which also constitute poles) move radially into contact with the work. Magnetic fields of high frequency and low intensity are produced which have the effect of heating by induction the circumferential areas only, high frequency fields having little penetration and the skin effect being enhanced by the large number of poles. The work will rotate slowly if the pressure of the plungers is sufficiently decreased by tension in the springs 52 or if a thin layer or sleeve of smooth material is wrapped around the work to diminish friction and make a magnetic gap. Such rotation will increase the uniformity of heating and is especially effective when there are comparatively few poles. However, it is frequently desirable to dispense with the rotation so that insertion of the balls will not be made more difficult. A temperature rise from room temperature of 70° to 300° F. in about 20 seconds will occur with the illustrated structure.

The bearing illustrated is one of the most difficult to assemble partly because it is preloaded, that is, the balls are under a predetermined compression after assembly between the rings and also because the two rows are widely spaced and the separators are of the wavy or ribbon type into whose pockets half of the balls are separately introduced through the filling slots, the separator being turned after each such ball is inserted. When preparing bearings for heating, if they are double row bearings as indicated, one complete row of balls and their separator can be placed against the inner race ring as indicated in Fig. 6, and the outer race ring shifted axially over the balls while all parts are cold. Also some of the balls of the other or upper row can be introduced between the rings as shown in Fig. 7 before any heat is applied, and this partly assembled bearing will hold together for handling as a unit. The partly assembled bearing is then inserted between the plungers and the current switched on. As the plungers come in and the outer race ring heats, the operator can begin at once to shift the previously assembled balls circumferentially into proper spaced relation and introduce the wavy separator. He can then force the remaining balls one at a time through the filling slots into the upper separator pockets, the outer race ring also preferably being stretched mechanically. The last ball assembled (which is the one most likely to be damaged or to cause damage because of the strain) is thus inserted when the outer race ring is near its maximum temperature and this occurs before any appreciable heat reaches the balls on the inner race ring. Upon switching off the current, the springs 52 move the plungers outwardly a little to release the bearing which can be lifted or pushed out of its seat. The device is useful also for facilitating knocking down or dis-assembling bearings and for removing bushings from shafts. Although the device is shown as employed in the assembly of bearings, it is obvious that it is applicable to the heating of circumferential portions of any circular article and, in its broader aspects, the invention is applicable to the heating of other things.

I claim:

1. In a device of the character described, a core comprising a series of arcuate laminations, laminated plungers movable radially of said arcuate laminations, and coils surrounding the laminated plungers; substantially as described.

2. In a device of the character described, a core comprising a series of arcuate laminations forming a ring with radial interruptions, laminated poles arranged radially at the interruptions and collectively forming a circular work-receiving space, and a plurality of coils associated with the laminations for creating a plurality of alternating magnetic fields of high frequency and low intensity along arcuate portions of a work-piece in said space; substantially as described.

3. In a device of the character described, a core comprising a series of arcuate laminations forming a ring with radial interruptions, a plurality of laminated plungers shiftable radially through the interruptions, coils surrounding the plungers for advancing them towards a common center, and springs resisting said movement of advance; substantially as described.

4. In a device of the character described, a core comprising a series of arcuate laminations forming a ring with radial interruptions, a plurality of laminated plungers shiftable radially through the interruptions, coils surrounding the plungers for advancing them towards a common center, springs resisting said movement of advance, and means for adjustably connecting the plungers to the springs; substantially as described.

5. In a device of the character described, a plurality of laminated poles arranged radially with respect to a common center and having their inner ends adjacent to one another, a laminated core between the poles adjacent to their outer ends, and a coil associated with each of the poles; substantially as described.

6. In a device of the character described, a series of laminated poles arranged radially with respect to a common center, means for guiding said poles for radial shifting movement, the inner ends of the poles forming a circular work-receiving space, a coil associated with each pole to shift said pole radially towards a work-piece in said space, and there being groups of coils with individual coils of each group in series with one another; substantially as described.

7. In a device of the character described, a series of laminated poles arranged radially with respect to a common center, means for guiding said poles for radial shifting movement, the inner ends of the poles forming a circular work-receiving space, a coil around each pole to shift said pole radially towards a work-piece in said space, means for effecting radial adjustment of the poles initially with respect to the work-piece, and the inner portions of the poles being bevelled at the sides; substantially as described.

8. In a device of the character described, a series of laminated poles arranged radially with respect to a common center, the inner ends of the poles forming a circular work-receiving space, a coil associated with each pole, the inner ends of the poles being bevelled, means for effecting radial adjustment of the poles to correspond with the size of the work, and springs for resisting movement of the poles towards the center; substantially as described.

9. In a device of the character described, a work support, poles shiftable radially with respect to the center of the work support, a coil around each pole, and a laminated core extending from each pole to the next; substantially as described.

10. In a device of the character described, a work support, poles shiftable radially towards the center of the work support, a coil around each pole, a laminated core extending from each pole to the next, and a spring urging each pole away from the center; substantially as described.

11. In a device of the character described, a pair of rings, sets of laminations clamped between the rings and spaced apart around the rings, poles extending radially through said spaces, and a coil around each pole; substantially as described.

GUSTAV FREDRICKSON.